(12) United States Patent
Huang et al.

(10) Patent No.: US 8,448,424 B2
(45) Date of Patent: May 28, 2013

(54) EMISSION CONTROL SYSTEM WITH AN INTEGRATED PARTICULATE FILTER AND SELECTIVE CATALYTIC REDUCTION UNIT

(75) Inventors: Yinyan Huang, Northville, MI (US); Christine Kay Lambert, Dearborn, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 554 days.

(21) Appl. No.: 12/355,402

(22) Filed: Jan. 16, 2009

(65) Prior Publication Data

US 2010/0180579 A1 Jul. 22, 2010

(51) Int. Cl.
*F01N 3/00* (2006.01)
(52) U.S. Cl.
USPC ............ 60/286; 60/274; 60/297; 60/301; 60/311; 422/168; 422/177; 422/180
(58) Field of Classification Search
USPC ............ 60/274, 286, 295, 297, 299, 301, 60/303, 311; 422/168, 177, 180
See application file for complete search history.

(56) References Cited

U.S. PATENT DOCUMENTS

| | | | |
|---|---|---|---|
| 4,268,488 A | 5/1981 | Ginger | |
| 5,067,320 A | 11/1991 | Kanesaki | |
| 5,083,427 A | 1/1992 | Anderson | |
| 6,125,629 A | 10/2000 | Patchett | |
| 6,823,663 B2 * | 11/2004 | Hammerle et al. | 60/286 |
| 6,892,529 B2 * | 5/2005 | Duvinage et al. | 60/286 |
| 7,062,904 B1 * | 6/2006 | Hu et al. | 60/286 |
| 7,210,288 B2 * | 5/2007 | Bandl-Konr | 60/297 |
| 7,229,597 B2 | 6/2007 | Patchett et al. | |
| 7,775,035 B2 * | 8/2010 | Veigel et al. | 60/286 |
| 7,799,289 B2 * | 9/2010 | Robel | 422/180 |
| 2005/0031514 A1 | 2/2005 | Patchett et al. | |
| 2006/0088469 A1 | 4/2006 | Perez-Ramirez | |
| 2007/0051096 A1 | 3/2007 | Pfeifer et al. | |
| 2007/0122317 A1 | 5/2007 | Driscoll et al. | |
| 2008/0060348 A1 * | 3/2008 | Robel et al. | 60/295 |
| 2009/0311146 A1 | 12/2009 | Ohno et al. | |
| 2010/0064662 A1 * | 3/2010 | Hinz et al. | 60/274 |
| 2010/0101221 A1 * | 4/2010 | Charbonnel et al. | 60/301 |

FOREIGN PATENT DOCUMENTS

| | | |
|---|---|---|
| WO | 9736676 A1 | 10/1997 |
| WO | 03054364 A2 | 7/2003 |
| WO | 03054364 A3 | 7/2003 |

OTHER PUBLICATIONS

Tennison et al., NOx Control Development With Urea SCR on a Diesel Passenger Car, SAE Technical Paper Series 2004-01-1291, Mar. 8-11, 2004, 9 pages.

* cited by examiner

*Primary Examiner* — Binh Q Tran
(74) *Attorney, Agent, or Firm* — Damian Porcari; Brooks Kushman P.C.

(57) ABSTRACT

The present invention relates to an emission control system for reducing gases from the exhaust of a combustion process. In at least one embodiment, the emission control system includes an exhaust passage for transporting the exhaust from the combustion process; a reductant disposed within exhaust passage downstream of the combustion process, and an integrated particulate filter and selective catalytic reduction unit disposed downstream of the reductant, with the unit having a first selective catalytic reduction catalyst disposed within a first inner wall portion of the exhaust passage; and a particulate filter disposed within a second inner wall portion of the exhaust passage downstream of the first inner wall portion. In at least one particular embodiment, the particulate fileter is coated with a second selective catalytic reduction catalyst.

20 Claims, 4 Drawing Sheets

EMISSION CONTROL SYSTEM WITH AN INTEGRATED PARTICULATE FILTER AND SELECTIVE CATALYTIC REDUCTION UNIT

BACKGROUND

1. Technical Field

One or more of the embodiments of the present invention relate to an emission control system for removal of regulated combustion components from the exhaust of a combustion process, such as an internal combustion engine.

2. Background Art

A combustion engine exhaust often contains a variety of combustion components or gases including unburned hydrocarbon (HC), carbon monoxide (CO), particulate matter (PM), nitric oxide (NO), and nitrogen dioxide ($NO_2$), with NO and $NO_2$, collectively referred to as nitrogen oxide or $NO_x$.

Conventional emission control systems often use separate devices for the reduction of $NO_x$ or particulate matter. For example, a singular SCR (selective catalytic reduction) catalyst is used for converting $NO_x$ to nitrogen ($N_2$) and a singular particulate filter (PF) is used for removing particulate matter. In some instances, the singular SCR catalyst and the singular particulate filter are sequentially aligned and disposed separable from each other.

However, conventional emission control systems have met with limited use as they lack, among other things, concurrent and balanced consideration for emission control efficiency and space conservation. For example, the use of multiple SCR catalysts in line with a downstream stand-alone particulate filter can result in substantial space consumption. On the other hand, a singular SCR/PF device, while capable of reducing the space required to some extent, can cause other inherent issues such as inadequate catalyst mixing and/or insufficient catalytic temperature window. For instance, the singular SCR/PF device can result in a relatively narrow catalytic temperature window and/or relatively insufficient catalytic activity at higher temperatures, such as above 500 degrees Celsius.

There is thus a continuing need to provide an emission control system with a relatively high catalytic temperature range and $NO_x$ reduction efficiency while minimizing system complexity.

SUMMARY

According to at least one aspect of the invention, an emission control system for reducing gases from the exhaust of a combustion process is provided. In at least one embodiment, the emission control system includes an exhaust passage for transporting the exhaust from an engine, a reductant disposed within the exhaust passage downstream of the combustion process, and an integrated particulate filter and selective catalytic reduction (SCR) unit disposed downstream of the reductant. In at least this embodiment, the integrated particulate filter and SCR unit includes a first selective catalytic reduction catalyst (SCR1) disposed within a first inner wall portion of the exhaust passage, and a particulate filter disposed within a second inner wall portion of the exhaust passage downstream of the first inner wall portion. In at least this embodiment, the the particulate filter is coated with a second selective catalytic reduction catalyst (SCR2/PF).

In at least another embodiment, the reductant is introduced at a location no more than 140 centimeters upstream of the SCR1.

In at least yet another embodiment, the SCR1 and the SCR2/PF are spaced no more than 120 centimeters apart.

In at least yet another embodiment, the SCR1 has a loading concentration in the range of 1.0 to 7.0 grams per cubic inch of the first inner wall portion of the exhaust passage.

In at least yet another embodiment, the SCR1 is catalytically active for converting 85 percent or more by volume of $NO_x$ to nitrogen in a temperature range of 250 to 550 degrees Celsius.

In at least yet another embodiment, the second SCR catalyst of the SCR2/PF has a loading concentration in the range of 0.5 to 6.0 grams per cubic inch of the second inner wall portion of the exhaust passage.

In at least yet another embodiment, the second SCR catalyst of the SCR2/PF is catalytically active for converting 85 percent or more by volume of $NO_x$ to nitrogen in a temperature range of 150 to 500 degrees Celsius.

In at least yet another embodiment, the emission control system further includes an oxidation catalyst disposed within the exhaust passage downstream of the integrated particulate filter and SCR unit.

According to at least another embodiment, the emission control system includes an exhaust passage for transporting the exhaust from the engine, an oxidation catalyst disposed within the exhaust passage, and a reductant disposed within the exhaust passage downstream of the oxidation catalyst. In at least this embodiment, the emission control system also include a first selective catalyst reduction catalyst disposed within the exhaust passage downstream of the reductant, and a particulate filter disposed within the exhaust passage downstream of the first selective catalytic reduction catalyst.

According to at least yet another aspect of the present invention, a method is provided for reducing gases from the exhaust of an internal combustion engine. In at least one embodiment, the method includes contacting the exhaust with a reductant and a first selective catalytic reduction catalyst (SCR1) to form a first treated exhaust, and exposing the first treated exhaust to a particulate filter coated with a second selective catalytic reduction catalyst (SCR2/PF) to form a second treated exhaust.

DETAILED DESCRIPTION OF THE PREFERRED EMBODIMENT(S)

Figures 1A, 1B:
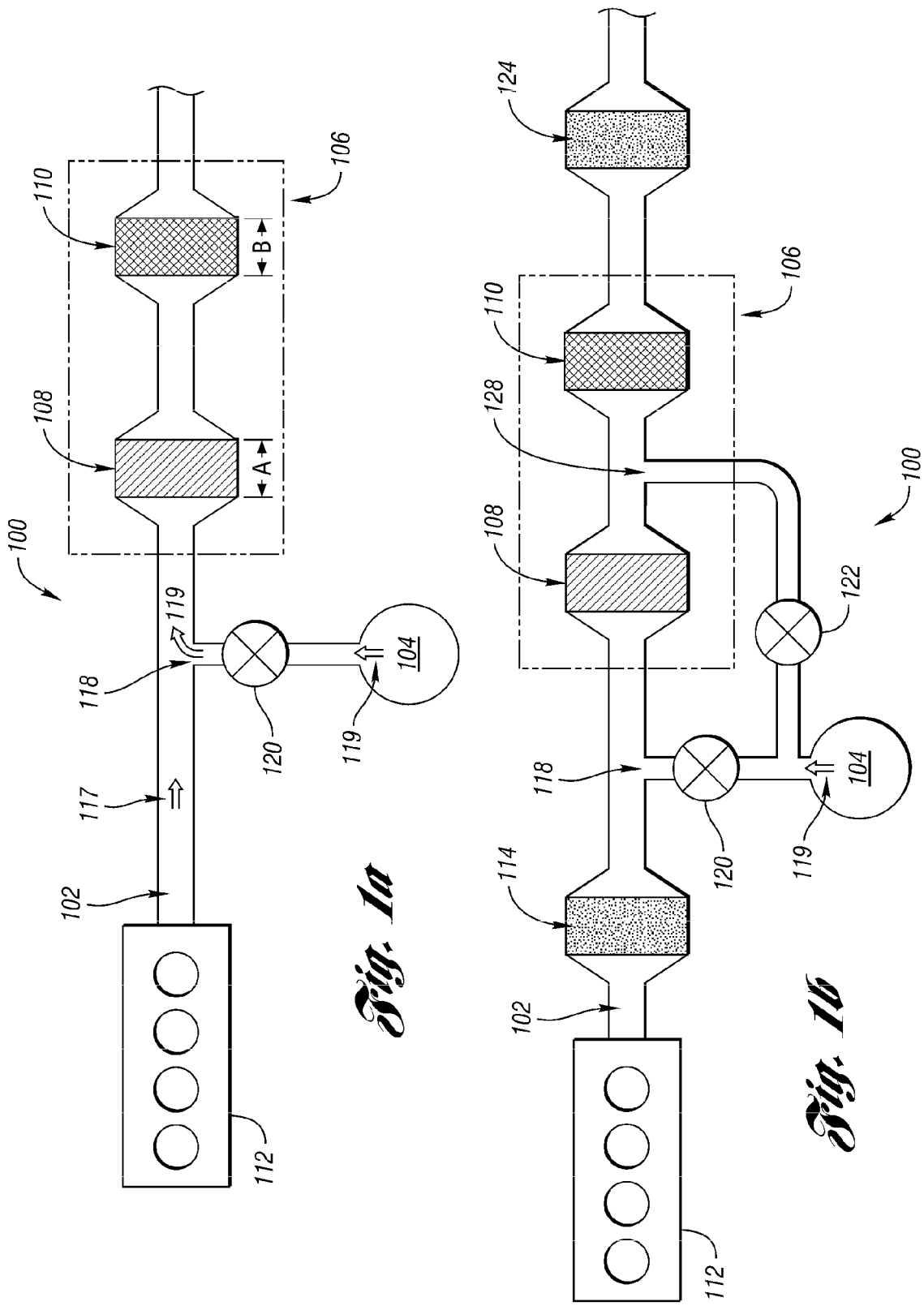
FIGS. 1A-1B schematically depict configurations of an emission control system according to various embodiments of the present invention.

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Practice within the numerical limits stated is generally preferred. Also, unless expressly stated to the contrary, the description of a group or class of material as suitable or preferred for a given purpose in connection with the invention implies that mixtures of any two or more members of the group or class may be equally suitable or preferred.

As used herein and unless otherwise noted, the term "PM filter" or "PF" is interchangeably used to refer to the particulate filter employed to remove particulate matter or the like.

The present invention is capable of reducing gases from the exhaust of a combustion process, such as for instance an internal combustion engine such as a diesel engine or a gasoline engine.

In at least one embodiment, an emission control system uses an integrated particulate filter and SCR (selective catalytic reduction) unit illustrated as "SCR1+SCR2/PF", which includes a first SCR catalyst (SCR1) followed by a particulate filter with a second SCR catalyst (SCR2/PF). The first SCR catalyst can be attached to a flow-through monolith and therefore, the exhaust flows through the monolith while being treated by the first SCR catalyst. The second SCR catalyst can be coated on a wall-flow PM filter and the resulting SCR2/PF portion of the integrated particulate filter and SCR unit performs concurrently at least two functions, namely reduction of the $NO_x$ and removal of the particulate matter.

The integrated particulate filter and SCR unit, as described in more detail below, is believed to provide at least one of the following advantages including—a broadened catalytically active temperature range; more adequate mixing between the exhaust and the catalysts; and a reasonable reduction in the overall system complexity and space required.

With respect to the Figures that will be described in detail below, like numerals are used to designate like structures throughout the Figures. An emission control system in accordance with at least one embodiment of the present invention is generally shown at 100 in FIG. 1A. The emission control system 100 includes an exhaust passage 102 and an integrated particulate filter and SCR unit 106. In the illustrated embodiment, a reductant 119 is disposed within the exhaust passage 102 downstream of an engine 112. An aperture 118 is optionally located on the exhaust passage 102 and disposed between the engine 112 and the integrated particulate filter and SCR unit 106 to facilitate the introduction of the reductant 119 into the exhaust passage 102. The reductant 119, capable of reducing $NO_x$ to nitrogen $N_2$, is injected into the exhaust passage 102 optionally through a nozzle (not shown). The injection of the reductant 119 is optionally achieved through the use of a valve 120 which can be employed to meter needed amounts of the reductant 119 into the exhaust. The exhaust 117 with the reductant 119 is then conveyed further downstream to the integrated particulate filter and SCR unit 106 for the reduction of $NO_x$ and particulate matter.

In at least one embodiment, the aperture 118 is disposed no more than 140 centimeters upstream of the first SCR catalyst 108. In at least another embodiment, the aperture 118 is disposed no more than 100 centimeters upstream of the first SCR catalyst 108.

In at least another embodiment, the range of the distance between the aperture 118 and the first SCR catalyst 108 may be independently selected from a range of no less than 0.5 centimeters, 10 centimeters, 20 centimeters, 30 centimeters, 40 centimeters, 50 centimeters, 60 centimeters, or 70 centimeters, to no greater than 140 centimeters, 130 centimeters, 120 centimeters, 110 centimeters, 100 centimeters, 90 centimeters, or 80 centimeters.

The reductant 119 may be of any material suitable for reducing $NO_x$ to a harmless, releasable substance such as nitrogen $N_2$. Exemplary reducing agents are hydrocarbon (HC), ammonia ($NH_3$), an ammonia precursor such as liquid urea, or any combination thereof. As is known, when exposed to a warm or hot exhaust, urea readily decomposes to ammonia. In certain embodiments, a molar ratio of $NH_3/NO_x$ is typically kept at a value predesignated so as to inhibit excess $NH_3$ from slipping past the catalysts and out into the air. An exemplary molar ratio of $NH_3/NO_x$ is at or near one (1). Decomposition of urea and subsequent reduction of $NO_x$ typically occurs according to the following scheme:

Urea decomposition:

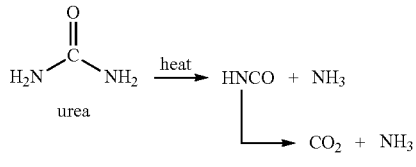

$NO_x$ reduction:

$$4NO + 4NH_3 + O_2 \longrightarrow 4N_2 + 6H_2O$$
$$6NO_2 + 8NH_3 \longrightarrow 7N_2 + 12H_2O$$
$$2NH_3 + NO + NO_2 \longrightarrow 2N_2 + 3H_2O$$

Suitable SCR catalyst compositions for both the SCR1 108 and the SCR2/PF 110 are able to effectively catalyze the reduction of $NO_x$. In at least one embodiment, the SCR catalysts are capable of converting at least 50% of $NO_x$ to nitrogen ($N_2$), depending on the amount of the reductant 119 supplied. Useful SCR catalysts should also have thermal resistance to temperatures greater than 650 degree Celsius so that the SCR catalysts remain structurally integral throughout an exhaust treatment process.

As used herein and unless otherwise identified, a SCR catalyst is "catalytically functional" in a given temperature when at that temperature, the SCR catalyst is able to convert 50 percent or more by volume of $NO_x$ to nitrogen.

As used herein and unless otherwise identified, a SCR catalyst is "catalytically active" in a given temperature when at that temperature, the SCR catalyst is able to convert 85 percent or more by volume of $NO_x$ to nitrogen.

In at least one embodiment, the first SCR catalyst 108 is catalytically functional in a temperature range of about 150 to 650 degrees Celsius and in at least another embodiment is catalytically active for converting 85 percent or more by volume of $NO_x$ to nitrogen in a temperature range of 250 to 550 degrees Celsius.

In yet at least one embodiment, the second SCR catalyst on the particulate filter 110 is catalytically functional in a temperature range of about 150 to 650 degrees Celsius and in at least another embodiment is catalytically active for converting 85 percent or more by volume of $NO_x$ to nitrogen in a temperature range of 150 to 500 degrees Celsius. The catalytically active temperature range for the second SCR catalyst, which is illustrated in FIG. 1A to be disposed downstream of the first SCR catalyst 108, is generally lower in contrast with the range for the first SCR catalyst 108. This is beneficial at least in that the staged catalyst distribution provided by the integrated particulate filter and SCR unit 106 responds to a similarly staged operating temperature profile, e.g., in a gradually cooling fashion along the exhaust passage 102 as the exhaust 117 proceeds downstream from the engine 112.

Suitable SCR catalysts are described in U.S. Pat. No. 4,961,917 to Byrne, the entire content of which is incorporated by reference herein. Some suitable compositions include one or both of an iron and a copper metal atom present in a zeolite in an amount of from about 0.1 to 30 percent by weight of the total weight of the metal atoms plus zeolite. Zeolites are resistant to sufur poisoning and remain active during a SCR catalytic reaction. Zeolites typically have pore sizes large enough to permit adequate movement of $NO_x$, ammonia, and product molecules $N_2$ and $H_2O$. The crystalline structure of zeolites exhibits a complex pore structure having more or less regularly recurring connections, intersections, and the like. By way of example, suitable zeolites are made of crystalline aluminum silicate, with a silica to alumina ratio in the range of 5 to 400 and a mean pore size from 3 to 20 Angstroms.

Suitable SCR catalyst to be used in the integrated particulate filter and SCR unit 106 may be a physical mixture of two or more catalysts in any suitable ratio. By way of example, the first SCR catalyst 108 of the integrated "SCR1+SCR2/PF" unit 106 can be an iron-containing zeolite combined with one or more other metals selected from the group consisting of vanadium, chromium, molybdenum, tungsten, or any combinations thereof. Similarly, the SCR2 catalyst of the integrated "SCR1+SCR2/PF" unit 106 can be a copper-containing zeolite combined with one or more other metals selected from the group consisting of vanadium, chromium, molybdenum, tungsten, or any combinations thereof.

The first SCR catalyst 108 may be directly and/or indirectly disposed within the exhaust passage 102. In at least one embodiment, the first SCR catalyst 108 is disposed within the exhaust passage 102 indirectly via a flow-through (FT) monolith. Monoliths are well known but are generally described as a ceramic block made of a number of parallel tubes. The monolith may be made of ceramic materials such as cordierite, mullite, and silicon carbide or metallic materials such as iron chromium alloy, stainless steel, and Inconel®. The individual tubes of the monolith may be of any suitable size, and in certain embodiments are of a size of 0.5 to 10 millimeters in diameter. Because of the number of the passages, the contact area between an exhaust and the first SCR catalyst is relatively high. Further, the tubes are substantially straight, hollow, and parallel to the flow of the exhaust, therefore flow obstruction to the exhaust is effectively minimized.

Further, the first SCR catalyst 108 may be disposed within and coupled to the exhaust passage 102 directly through a suitable binding method. One exemplary binding method is adhesive binding. By way of example, the first SCR catalyst 108 can be directly coated on an inner surface of the exhaust passage 102 through an adhesive. One can employ the above-mentioned direct coupling, indirect coupling, or any combination thereof to deliver the desired loading of the first SCR catalyst 108.

In at least one embodiment, the first SCR catalyst 108 has a loading concentration defined as an amount in grams of the first SCR catalyst 108 per cubic inch of the first inner portion "A", shown in FIG. 1A, of the exhaust passage 102. In at least one particular embodiment, the first SCR catalyst 108 has a loading concentration in a range independently selected from no less than $1.0 \text{ g/in}^3$, $2.0 \text{ g/in}^3$, or $3.0 \text{ g/in}^3$, to no greater than $7.0 \text{ g/in}^3$, $6.0 \text{ g/in}^3$, $5.0 \text{ g/in}^3$, or $4.0 \text{ g/in}^3$.

In at least another embodiment, the second SCR catalyst coated on the particulate filter 110 has a loading concentration defined as an amount in grams of the second SCR catalyst per cubic inch of the second inner portion "B", as shown in FIG. 1A, of the exhaust passage.

In at least one particular embodiment, the second SCR catalyst has a loading concentration in a range independently selected from no less than $0.5 \text{ g/in}^3$, $1.0 \text{ g/in}^3$, $1.5 \text{ g/in}^3$, $2.0 \text{ g/in}^3$, to no greater than $6.0 \text{ g/in}^3$, $5.0 \text{ g/in}^3$, $4.0 \text{ g/in}^3$, or $3.0 \text{ g/in}^3$.

In at least another embodiment, the ratio of the loading concentration of the SCR1 108 relative to the loading concentration of the SCR2/PF 110 is 0.1 to 3.0, in another embodiment of 0.5 to 2.8, and in another embodiment of 1.0 to 2.5.

In at least another embodiment, the distance between the SCR1 108 and the SCR2/PF 110 may be independently selected from no less than 0.5, 10 centimeters, 20 centimeters, 30 centimeters, 40 centimeters, 50 centimeters, or 60 centimeters, to no greater than 70 centimeters, 80 centimeters, 90 centimeters, 100 centimeters, 110 centimeters, or 120 centimeters.

It has further been found that, the integrated particulate filter and SCR unit 106 as contemplated herein provides a synergistically broadened catalytic temperature range and hence enhanced $NO_x$ reduction efficiency in comparison prior art configurations. As illustrated in more detail below, the integrated particulate filter and SCR unit 106 alleviates the occurrence of a sharp "fall-off" of $NO_x$ removal efficiency at a given temperature, a phenomena often observed with singular SCR2/PF devices. In addition, the integrated and particulate filter and SCR unit 106 also exhibits $NO_x$ reduction in the 175 to 225 degrees Celsius temperature range; a range where SCR1 or SCR2/PF alone is typically catalytically inactive.

While not intended to be limited to any particularly theory, the synergistic broadening effect may be explained by the following: a close coupling of the SCR1 upstream of the SCR2/PF induces at least a partial conversion of $NO_x$ and hence a change in the ratio between various species of $NO_x$. As such, the resulting ratio of $NO_2/NO$ is better suited for a downstream catalytic conversion by the SCR2/PF catalyst. In addition, it is believed that during an engine cold start, when the SCR1 catalyst remains relatively less catalytically active, a reductant such as ammonia can slip through SCR1 and is utilized by SCR2 for $NO_x$ reduction. Finally, it is believed that the broadened catalytic temperature range is due at least in part to the flexibility of having separate SCR catalyst loadings provided by the integrated particulate filter and SCR unit 106 with the "SCR1+SCR2/PF" configuration, wherein the first SCR catalyst "SCR1" may be of a catalytic function that reacts well in a higher temperature range with a starting temperature of 250 degree Celsius, for instance.

In practice, typically the closer the exhaust stream is to the engine 112, the hotter the exhaust gets. As such, SCR1 is in contact with a substantially hotter exhaust than the second SCR catalyst in the SCR2/PF due to its downstream location. Accordingly, SCR1 is designed to be catalytically active at a temperature range between 250 to 550 degrees Celsius—higher than the temperature range for SCR2. Likewise, the second SCR catalyst of the SCR2/PF 110 is designed to be catalytically active within a lower temperature window than SCR1, slated at a range of between 150 to 450 degrees Celsius.

Furthermore, the integrated SCR1+SCR2/PF system 106 according to at least one embodiment of the present invention provides substantial space reduction in a range of 20 to 40 percent relative to a system where SCR1, SCR2, and PF are sequentially aligned.

In at least one embodiment, the second SCR catalyst is supported on a wall-flow particulate filter having a plurality of substantially parallel tubes extending along the longitudinal axis of the particulate filter. Typically, each tube is blocked at one end of the particulate filter, with alternate passages blocked at opposite ends. Such particulate filters contain up to about 700 or more parallel flow tubes per square inch of cross section, although 700 or less may also be used. An exemplary wall-flow particulate filter is composed of ceramic-like materials such as cordierite, $\alpha$-alumina, silicon carbide, silicon nitride, zirconia, mullite, spodumene, alumina-silica-magnesia, or zirconium silicate. The pore sizes and level of porosity are selected to allow flow exchange through the pores while ensuring that all back pressure on the particulate filter to be at a minimum. When made of ceramic material, the particulate filter in at least certain embodiments is constructed to have a porosity of from 45 to 85 percent by volume and to have a mean pore size from 5 to 30 microns.

In at least one embodiment, the particulate filter with the above-mentioned porosity is further processed to have the second SCR catalyst coated thereon. One exemplary method of such a coating is illustrated in U.S. Pat. No. 7,229,597 to Patchett et al., the entire contents of which are incorporated herein by reference. In essence, the particulate filter with a desired porosity is immersed in a catalyst slurry which is then allowed to dry under compressed air. This dipping-drying process may be repeated till the desired level of coating is achieved. After coating, the particulate filter may be dried at a temperature of 100 degrees Celsius and subsequently calcined at a temperature in the range of 300 to 500 degrees Celsius.

In at least one embodiment, and as shown in FIG. 1A and FIG. 1B, an oxidation catalyst 114 can be disposed within the exhaust passage 102 between the engine 112 and the aperture 118. Oxidation catalysts that contain platinum group metals, base metals and combinations thereof are known to facilitate the treatment of engine exhaust by promoting the conversion of both HC and CO gaseous pollutants and at least some portion of the particulate matter through oxidation of these pollutants to carbon dioxide and water. The oxidation catalyst 114 generally helps to break down pollutants in the exhaust to less harmful components. In particular, the oxidation catalyst 114 utilizes palladium and platinum catalysts to mainly help reduce the unburned hydrocarbon and carbon monoxide according to the following reaction formula: $CO+O2 \rightarrow CO2$.

When the oxidation catalyst 114 is used as illustrated in FIG. 1A and FIG. 1B, an exhaust containing unburned hydrocarbons (HC), carbon monoxide (CO), nitrogen oxide ($NO_x$), and particulate matter (PM) is emitted from the engine 112 through exhaust passage 102 to the oxidation catalyst 114. In the oxidation catalyst 114, unburned hydrocarbon and carbon monoxide are combusted to form carbon dioxide and water. Removal of the HC and CO using the oxidation catalyst 114 helps to relieve some burden on the downstream SCR unit 106 in remediating the exhaust.

In addition, the oxidation catalyst 114 also converts a certain portion of the nitric oxide NO to nitrogen dioxide $NO_2$ so that the $NO/NO_2$ ratio is more suitable for downstream SCR catalytic reactions. An increased proportion of $NO_2$ in the $NO_x$, due to the catalytic action of the upstream oxidation catalyst 114, facilitates the reduction of $NO_x$ as compared to exhaust streams containing smaller proportions of $NO_2$ in the $NO_x$ component. Furthermore, the oxidation catalyst 114 helps to regenerate particulate filter 110 for continuous engine operation. During diesel engine operation, soot typically will accumulate on the particulate filter 110 over time and cause back pressure elevation which diminishes the full operating efficiency of the engine. One solution is to generate a sufficiently high temperature in the range of about 600 to 700 degrees Celsius to induce the combustion of the soot by injecting fuel onto the oxidation catalyst 114.

The integrated particulate filter SCR unit 106 may be further altered in its configuration without materially changing its intended function. In at least one embodiment, and as shown in FIG. 1B, a secondary supply of reducing agent may be provided through a second aperture 128 located on the exhaust passage 102 between the first SCR catalyst 108 and the SCR2/PF 110. The second supply is provided from the source 104 is through a second valve 122. The second supply may be provided by a source separable from the source 104.

In at least one embodiment, and as shown in FIG. 1B, a second oxidation catalyst 124 can be disposed downstream of the integrated particulate filter and SCR unit 106. When used in concert with the first oxidation catalyst 114, the second oxidation catalyst 124 mainly serves to oxidize ammonia molecules that may have slipped through the exhaust passage 102 and to convert the slipped ammonia molecules to $N_2$. In addition, any unburned hydrocarbon that is left untreated may be oxidized at this point before final release into the air.

One or more embodiments of the present invention are further illustrated by the following non-limiting examples.

Example 1

Catalytic efficiency testing is carried out in a steady state whereas the catalysts used are in a non-aged or fresh condition; whereas ammonia is supplied at a level of 350 ppm (parts per million); whereas a simulated exhaust stream is provided to have 350 ppm $NO_x$; and whereas other testing parameters are set as follows: 14% of oxygen, 5% of carbon dioxide, 4.5% of water, and nitrogen to balance. The term "SCR1+SCR2/PF" represents an integrated particulate filter and SCR unit whereas the first SCR catalyst as denoted "SCR1" is an iron-containing zeolite and the SCR2/PF stands for the second SCR catalyst coated on a diesel particulate filter, with the second SCR catalyst being a copper-containing zeolite. The integrated particulate filter and SCR unit is tested at two alternative space velocity, namely either 15,000 per hour (or 15K per hour) or 30,000 per hour (or 30K per hour).

Space velocity is defined as v/V whereas v is the flow rate of an exhaust expressed in the unit of liter per hour and V is the volume of catalysts within a portion of the exhaust passage through which the exhaust passes. In this experiment, an exhaust travels in a flow rate of 6.44 liters per minute and the SCR1 is provided in a volume of 1 cubic inch, then the resulting space velocity is (6.44 L/min)(60 min)/(0.01287 L) which equals approximately 30K per hour. The testing is conducted in parallel comparison to SCR1 alone or to SCR2/PF alone. It is noted that in the "SCR1+SCR2/PF" configuration that the exhaust flow rate is kept at 6.44 liters per minute for a space velocity of 15K per hour due to an increase in the catalyst volume wherein SCR1 is aligned within a foot upstream of SCR2; likewise, an exhaust flow rate is doubled to 12.88 liters per minute to reach a space velocity of 30K per hour. When the amount of exhaust and hence the exhaust flow rate remains the same, for example, 6.44 liters per minute, "SCR1+SCR2/PF" at 15K per hour, space velocity is comparable to SCR1 alone of 30K per hour space velocity or SCR2/PF alone of 30K per hour space velocity. For the purpose of the experiments disclosed herein, a less than maximum amount of $NO_x$ is supplied through the exhaust; or put in a different way, the SCR1, the SCR2/PF, and the SCR1+SCR2/PF at either space velocity are each capable of converting the entire amount of the $NO_x$ under a suitable operating temperature.

Figure 2:
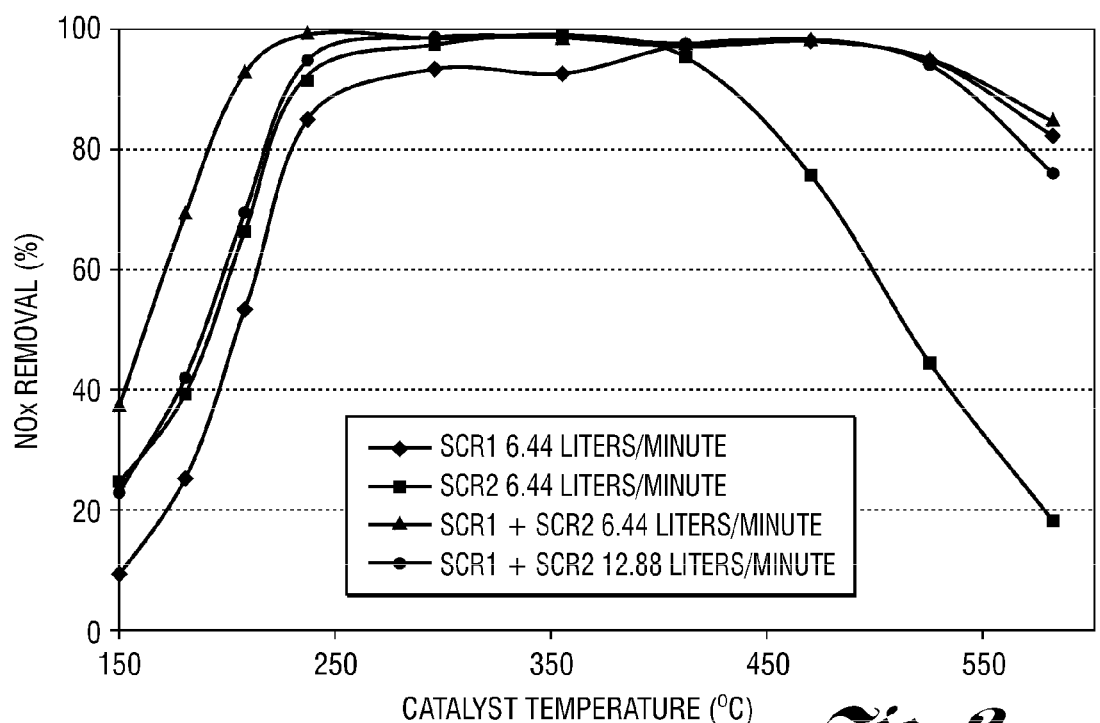
FIG. 2 shows the percentage of $NO_x$ removal as a function of catalytic temperature compared for catalyst compositions.

FIG. 2 depicts $NO_x$ efficiency as a function of operating temperatures in degree Celsius. At an exhaust flow rate of 6.44 liters per minute and to remove at least 90 percent by weight of the total $NO_x$ supplied, the SCR1 is catalytically active within a temperature range of 250 to 550 degree Celsius. A comparable range for the SCR2/PF catalyst is 225 to 450 degree Celsius.

In contrast, the integrated particulate filter and SCR unit shown at "SCR1+SCR2/PF" has a temperature range from 175 to 550 degrees Celsius spanning 375 degrees—a range at least 75 degrees broader than the range for SCR1 alone and at least 170 degrees broader than the range for SCR2/PF alone. Furthermore, the broadening effect is especially effectuated at the lower temperature end whereas the integrated particulate filter and SCR unit is now catalytically active at a temperature of 170 degrees Celsius that is lower than either SCR1 alone (250 degrees) or SCR2/PF alone (225 degrees). A similar broadening effect is observed even when the exhaust flow is doubled to 12.88 liters per minute and the corresponding space velocity for the integrated SCR1+SCR2/PF remains at 30K per hour. With the exhaust flow rate increased to 12.88 liters per minute, the integrated SCR1+SCR2/PF unit still shows a $NO_x$ reduction profile having a catalytically active temperature range broader than the range for the SCR1 and similar to the range for the SCR2/PF.

Example 2

The experiment is carried out under the same conditions set forth in Example 1 above. In this example, ammonia oxidation is being monitored. Ammonia oxidation is an alternative indication of how much ammonia is being consumed in the process of both reducing $NO_x$ and being oxidized by the oxygen in the exhaust. The ammonia that is not oxidized or consumed typically slips past the catalysts and is released into the air.

Figure 3:
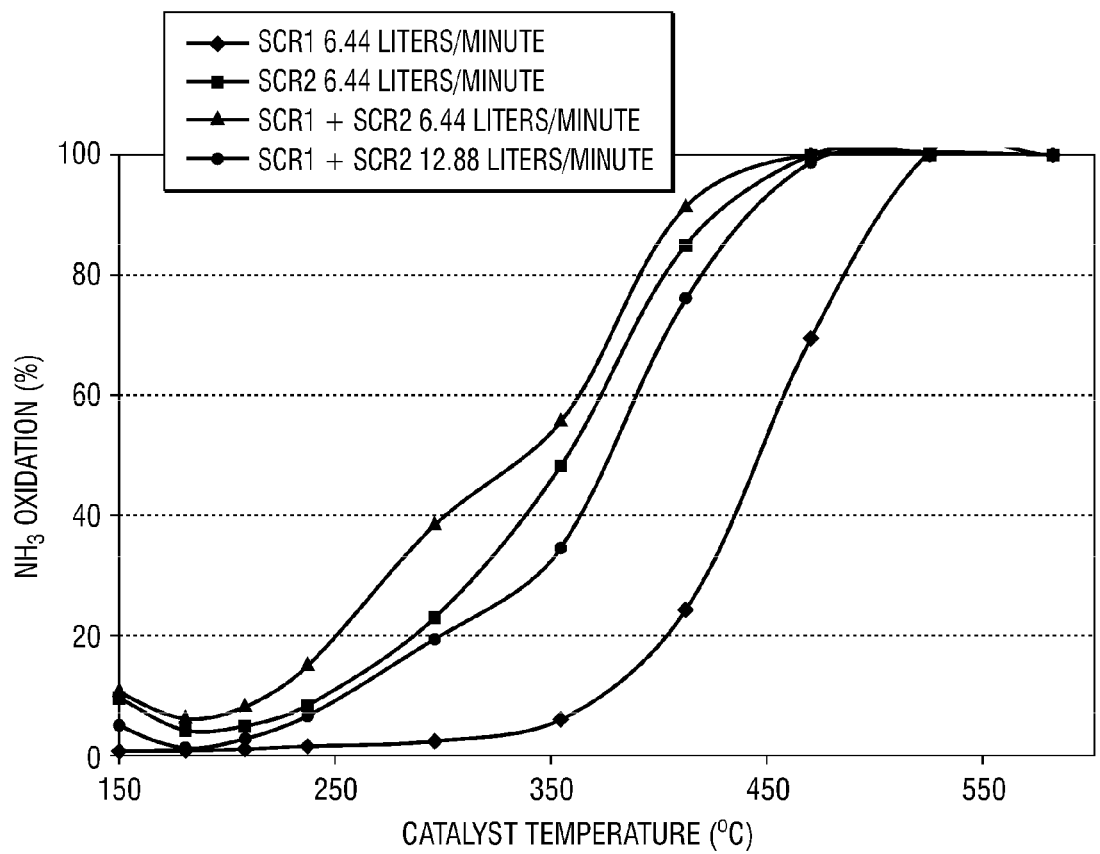
FIG. 3 shows the percentage of ammonia oxidation as a function of catalytic temperature for various catalyst compositions.

As depicted in FIG. 3, and within a temperature range of 150 to 450 degrees Celsius, ammonia usage through ammonia oxidation is the lowest in the SCR1 alone and highest in the integrated SCR1+SCR2/PF unit at a flow rate of 6.44 liters per minutes. With the exhaust flow rate substantially increased to 12.88 liters per minute, the integrated SCR1+SCR2/PF unit still shows greater ammonia oxidation relative to either the SCR1 alone or the SCR2/PF alone. When compared to either the SCR1 alone or the SCR2/PF alone, the integrated particulate filter and SCR unit at either space velocity demonstrates higher ammonia oxidation, and this observation is consistent with the higher $NO_x$ reduction that is observed in Example 1.

Example 3

Figure 4:
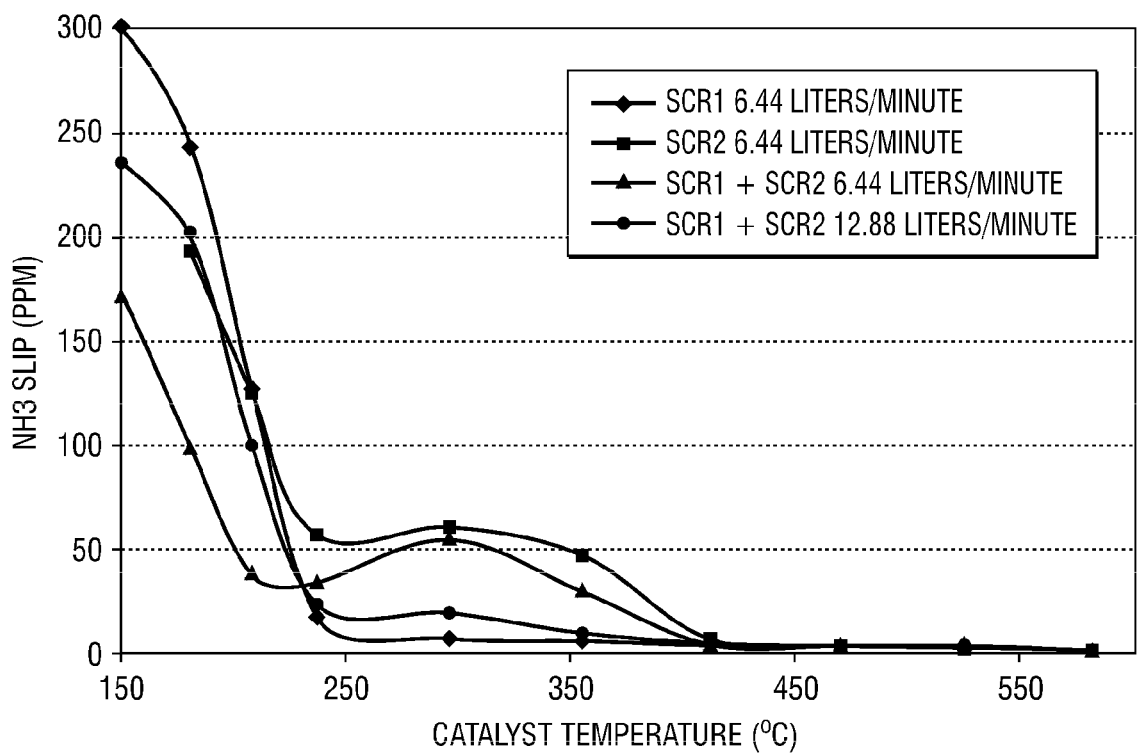
FIG. 4 shows ammonia slip, in ppm (parts per million), as a function of catalytic temperature for various catalyst compositions.

The experiment is carried out under the same conditions illustrated in Example 1 above. In this example, ammonia slip is being monitored. Amongst all four configurations tested and as shown in FIG. 4, the SCR1 alone configuration elicits the highest ammonia slip at temperatures in the range of 150 to 250 degrees Celsius. Ammonia slip in the SCR1 configuration quickly decreases to below 10 ppm at above 250 degree Celsius.

Since ammonia oxidation is generally reciprocal to ammonia slip in a given catalyst environment, the ammonia slip profile of the SCR 1 configuration shown in FIG. 4 is observed to be reciprocally consistent with the ammonia oxidation of the same SCR1 configuration as reported in FIG. 3. This is consistent with the activity of ammonia oxidation reported in FIG. 3 for SCR1. Although all tested configurations exhibit minimum ammonia slip at a level at or below 50 ppm, when the catalyst temperature is at or above 250 degrees Celsius, the integrated particulate filter and SCR1+SCR2/PF, at either flow rate, exhibits an ammonia slip substantially lower than the ammonia slip of either the SCR1 alone or the SCR2/PF alone at a temperature range of between about 175 to 250 degrees Celsius.

Example 4

Catalytic efficiency testing is carried out in a steady state wherein all of the catalysts used are in an aged condition simulated by a hydrothermal aging process. Other testing parameters are set as follows: 14% of oxygen, 5% of carbon dioxide, 4.5% of water, and nitrogen to balance. The aging process is conducted by exposing the catalysts at 800 degrees Celsius for 50 hours. The term "SCR1+SCR2/PF" represents an integrated particulate filter and SCR unit wherein the first SCR catalyst as denoted "SCR1" is iron-containing zeolite and the SCR2/PF stands for the second SCR catalyst coated on the diesel particulate filter, with the second SCR catalyst being a copper-containing zeolite. The integrated particulate filter and SCR unit is tested at a space velocity of either 15K or 30K per hour. The testing is conducted in comparison to SCR1 alone or to SCR2/PF alone.

Figure 5:
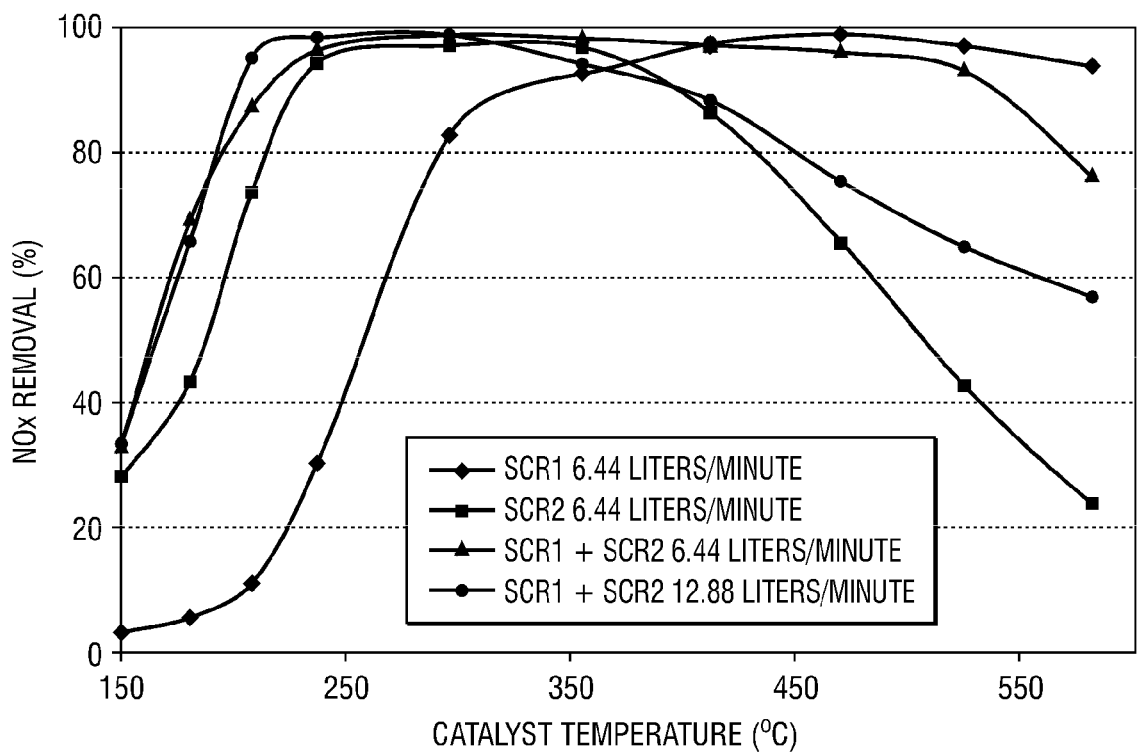
FIG. 5 shows the percentage of $NO_x$ removal, as a function of catalytic temperature for various catalyst compositions that were previously hydrothermally aged.

FIG. 5 depicts $NO_x$ removal efficiency by the above described catalysts against operating temperatures in degree Celsius. At 30K per hour space velocity, the catalytically active temperature for 90 percent $NO_x$ reduction for the SCR1 catalyst is in the range of 320 to 550 degree Celsius whereas the range for SCR2/PF catalyst is 230 to 420 degree Celsius. In comparison, the integrated particulate filter and SCR unit shown as "SCR1+SCR2/PF" evidences a temperature range from 210 to 475 degrees Celsius with the lower temperature end being more broadened so that the integrated particulate filter and SCR unit is still catalytically active from 210 to 320 degrees Celsius—a range in which the SCR1 counterpart remains inactive.

Example 5

The experiment is carried out under the same conditions set forth in Example 4 above. In this example, ammonia oxidation is being monitored. Within a temperature range of 150 to 350 degrees Celsius, the SCR1 catalyst alone exhibits essentially zero ammonia oxidation activity while the integrated particulate filter and SCR unit, at both 30,000 and 15,000 per hour space velocity, shows substantial levels of ammonia oxidation, up to 80%, and maintains a trend much similar to that of SCR2/PF alone.

Example 6

Figure 6:
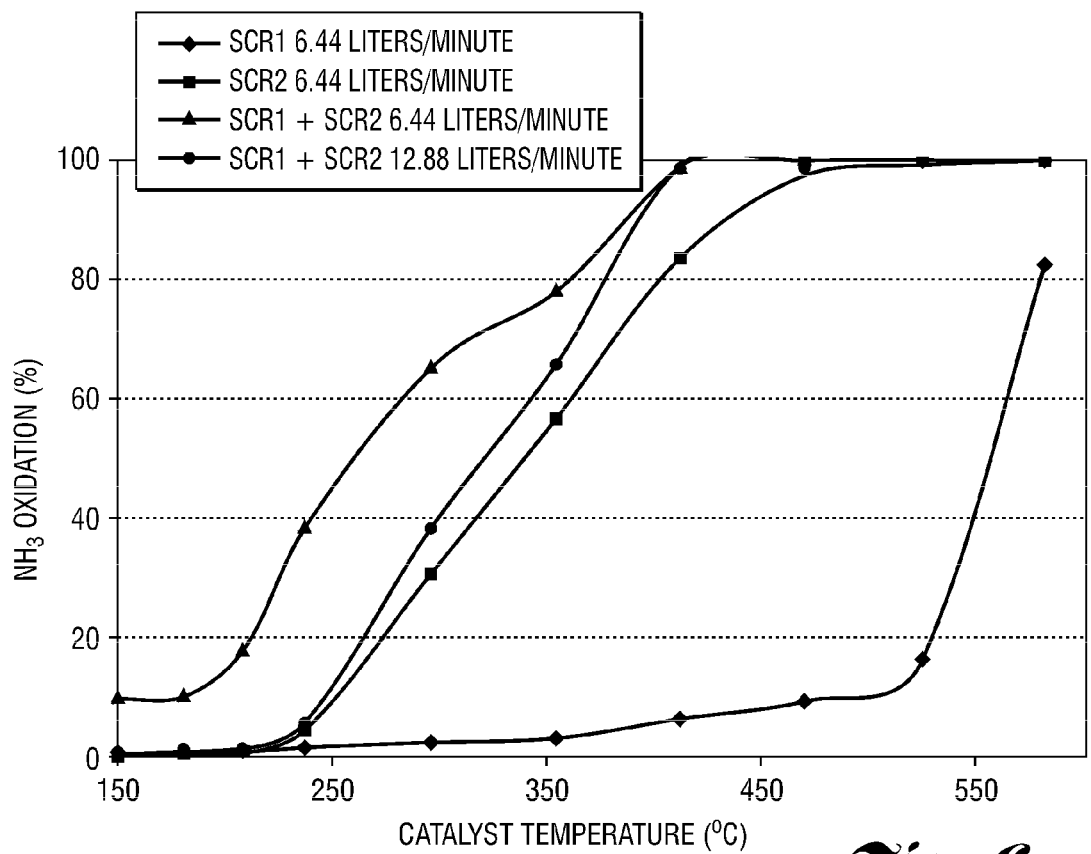
FIG. 6 shows the percentage of ammonia oxidation as a function of catalytic temperature for various catalyst compositions that were previously hydrothermally aged.
Figure 7:
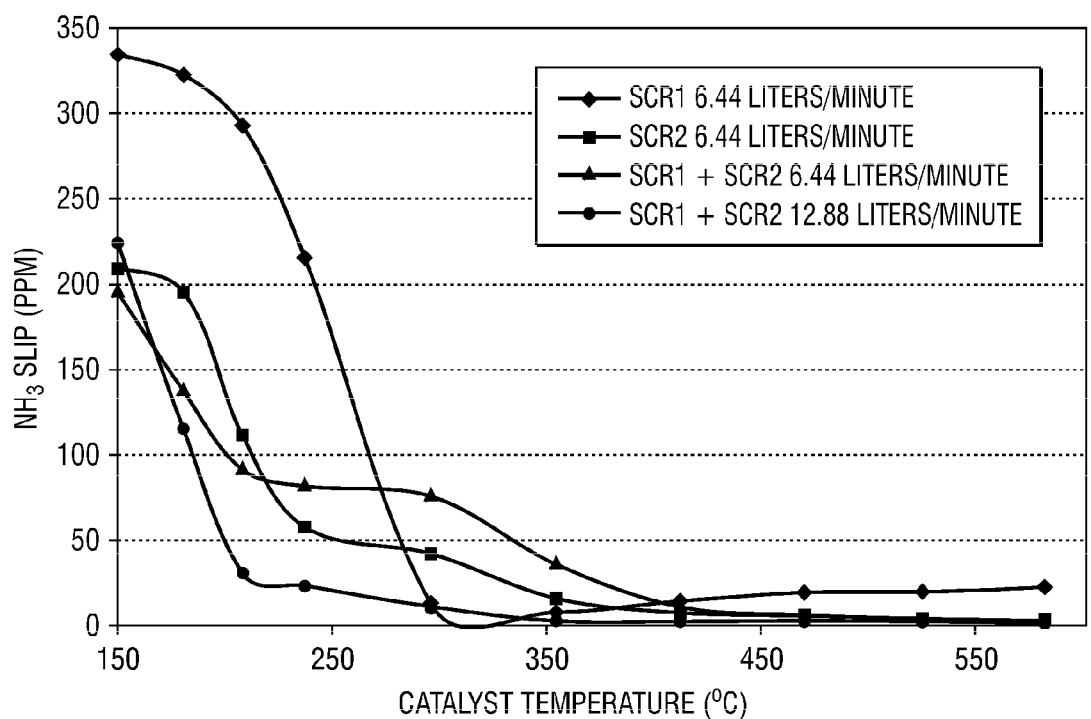
FIG. 7 shows ammonia slip, in ppm (parts per million), as a function of catalytic temperature for various catalyst compositions that were hydrothermally aged.

The experiment is carried out under the same conditions illustrated in Example 4 above. In this example, ammonia slip is being monitored. As shown in FIG. 7, the SCR1 catalyst alone exhibits a higher ammonia slip at a temperature below 300 degree Celsius and quickly decreases to below 20 ppm at above 300 degree Celsius. It is consistent with the activity of ammonia oxidation shown in FIG. 6. With SCR2/PF, the ammonia slip is lower than that of SCR1 alone at below 300 degrees Celsius but is higher than that of SCR1 in the range of 300 to 350 degrees Celsius. At above 400 degrees Celsius, the ammonia slip over SCR2/PF is lower than 10 ppm. At a temperature range of 170 to 220 degrees Celsius, the integrated particulate filter and SCR unit at a space velocity of 30,000 per hour, exhibits a lower ammonia slip in comparison to either SCR1 or SCR2/PF alone. At temperatures above 300 degrees Celsius, the ammonia slip is maintained well below 10 ppm by the integrated particulate filter and SCR unit. At a space velocity of 15,000 per hour, the integrated particulate filter and SCR unit again has a much lower ammonia slip within the range of 150 to 225 degrees Celsius while maintaining the ammonia slip relatively below 100 ppm within the range of 220 to 350 degrees Celsius.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system including an integrated unit comprising:
   a selective catalytic reduction (SCR) unit coated with an iron-containing zeolite; and
   a particulate filter downstream the SCR unit and coated with a copper-containing zeolite SCR catalyst.

2. The system of claim 1, further comprising an aperture introducing a reductant to the SCR unit and being 140 centimeters or less upstream of the SCR unit.

3. The system of claim 1, wherein the SCR unit and the particulate filter are spaced apart no more than 120 centimeters.

4. The system of claim 1, wherein the iron-containing zeolite of the SCR unit has a loading concentration from 1.0 to 7.0 grams per cubic inch.

5. The system of claim 1, wherein the SCR unit converts 85 percent or more by volume of $NO_x$ to nitrogen in a temperature range of 250 to 550 degrees Celsius.

6. The system of claim 1, wherein the copper-containing zeolite SCR catalyst of particulate filter has a loading concentration from 0.5 to 6.0 grams per cubic inch.

7. The system of claim 1, wherein the particulate filter converts 85 percent or more by volume of $NO_x$ to nitrogen in a temperature range of 150 to 500 degrees Celsius.

8. The system of claim 1, further comprising an oxidation catalyst upstream the SCR unit.

9. A system comprising:
   an exhaust passage;
   an oxidation catalyst disposed within the exhaust passage;
   an ammonia reductant disposed within the exhaust passage downstream of the oxidation catalyst;
   a selective catalytic reduction (SCR) unit coated with an iron-containing zeolite and disposed within the exhaust passage downstream of the reductant; and
   a particulate filter disposed within the exhaust passage downstream of the SCR catalyst and coated with a copper-containing zeolite SCR catalyst.

10. The system of claim 9, wherein the SCR unit and the particulate filter are spaced apart no more than 120 centimeters.

11. The system of claim 9, wherein the reductant is introduced 140 centimeters or less upstream of the SCR unit.

12. The system of claim 9, further comprising an oxidation catalyst disposed within the exhaust passage downstream of the particulate filter.

13. A method comprising:
    contacting the exhaust with an ammonia reductant and an iron-containing SCR catalyst to form a first treated exhaust; and
    exposing the first treated exhaust to a particulate filter coated with a copper containing SCR catalyst to form a second treated exhaust.

14. The method of claim 13, further comprising injecting, prior to the exposing step, a second reducing agent within the exhaust passage at a location between the SCR unit and the particulate filter.

15. The method of claim 13, further comprising directing the exhaust through an oxidation catalyst prior to the contacting step.

16. The system of claim 1, wherein the catalytically active temperature range of the integrated unit is at least 75 degrees Celsius broader than that of the SCR unit alone and is 170 degrees Celsius broader than that of the particulate filter alone.

17. The system of claim 1, wherein the ammonia oxidation of the integrated unit is greater than that of the SCR unit alone or the particulate filter alone.

18. The system of claim 1, wherein the ammonia slip of the integrated unit is less than that of the SCR unit alone or the particulate filter alone.

19. The system of claim 1, wherein the catalytically active temperature range of the integrated unit is 175 to 550 degrees Celsius.

20. The system of claim 1, wherein the catalytic efficiency of the integrated unit is greater than that of the SCR unit alone or the particulate filter alone.

* * * * *